April 1, 1958 — M. M. GUGGENHEIM — 2,828,549
APPARATUS FOR DRYING STARCH
Filed March 17, 1955
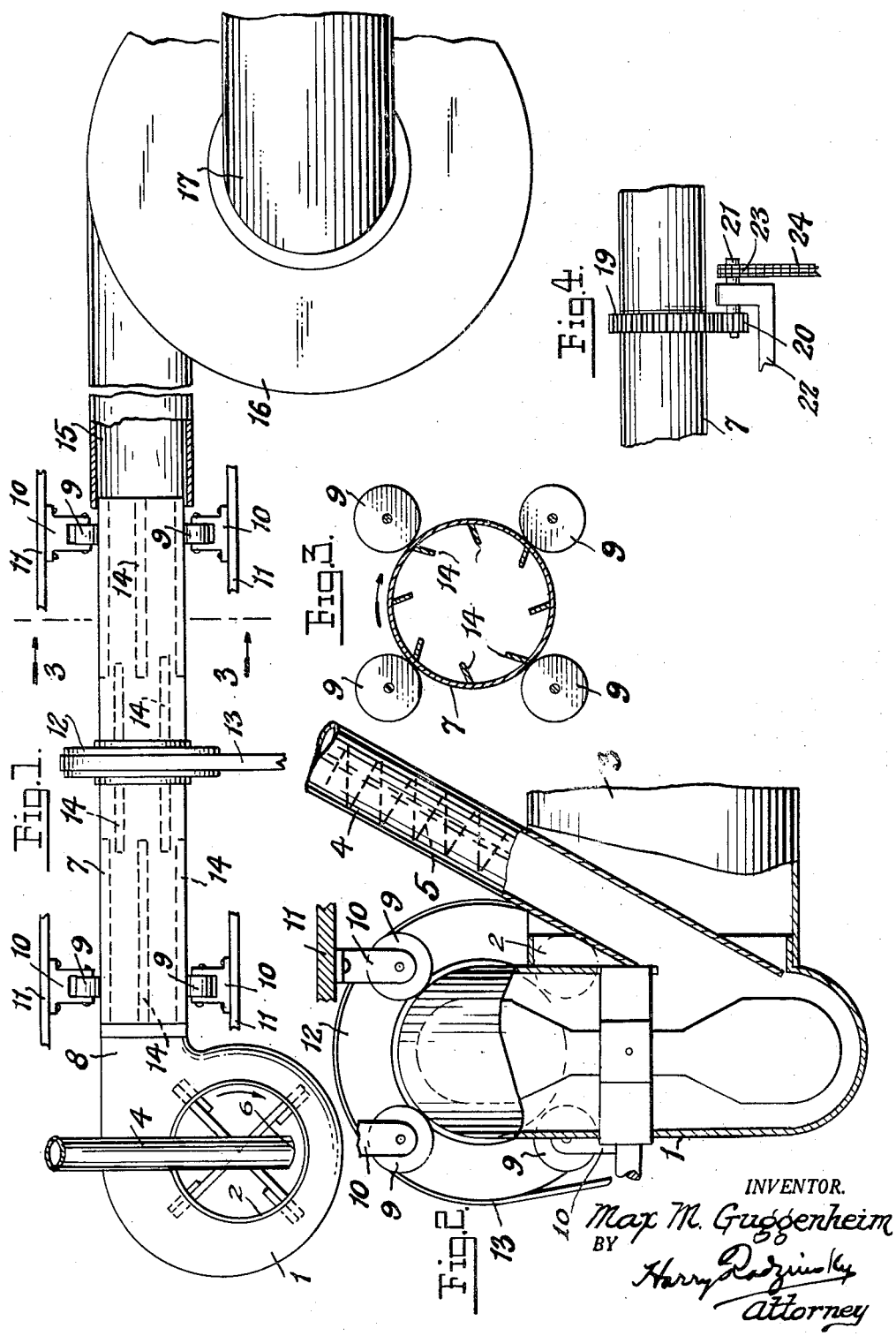
INVENTOR.
Max M. Guggenheim
BY Harry Radzinsky
Attorney

# United States Patent Office 2,828,549
Patented Apr. 1, 1958

2,828,549

APPARATUS FOR DRYING STARCH

Max M. Guggenheim, New York, N. Y., assignor to National Equipment Corporation, New York, N. Y., a corporation of New York Application March 17, 1955, Serial No. 494,929

1 Claim. (Cl. 34—57)

This invention relates to a method and apparatus by which the percentage of humidity in starch, flour and similar products can be materially reduced and controlled, thus presenting the product in the required dried state for certain specific uses. Starch is widely used in the art of manufacturing confectionery, and primarily for the making of molds into which the confectionery material is deposited to harden into the properly-shaped candies.

It is therefore an object of the present invention to provide a new means and method by which the starch may be easily and speedily dried to the required extent, and to a desired humidity, resulting in a well-dried, fluffy product found exceptionally satisfactory for employment in confectionery molds and for many other uses.

More particularly, the invention contemplates the provision of means by which air is first cooled and then heated to a temperature of possibly 250 to 300 degrees Fahrenheit, and such heated air is drawn at a uniform and regulatable rate into a compression blower into which a constant and uniform flow of starch is fed directly against the blades of the rotor of the blower, the hot air and starch thus taken in one blower being forced through and tumbled within a lengthy, constantly-rotating tube and then into a so-called "cyclone" separator in which the warmed and dried starch descends to the outlet of the separator, while the hot air freed of the starch, ascends and is blown out of the upper air outlet of the separator.

With these and other objects to be hereinafter set forth in view, I have devised the particular arrangement of parts and steps to be described, and more particularly pointed out in the claim appended hereto.

In the accompanying drawing, wherein an illustrative embodiment of the invention is disclosed, Figs. 1 is a side elevation with parts in section, of a simple form of apparatus by which the present invention may be carried out;

Fig. 2 is an end view of the apparatus, looking at the same from the left of Fig. 1;

Fig. 3 is a sectional view, taken substantially on the line 3—3 of Fig. 1, looking in the direction of the arrows, but with the supporting elements or bearings for the rollers omitted, and Fig. 4 shows a modified form of driving means for the rotating conduit or tube.

Referring to the drawing, 1 indicates the housing of a high-pressure type or compression blower of known construction, and which contains a rotor of the well-known bladed type and driven in any suitable manner. The inlet of the blower includes an annular flange 2 to which one end of a heated-air conduit 3 is connected, as shown in Fig. 2. Heated or conditioned air is drawn through the conduit 3 from any suitable source, by means of the blower, and the air enters into the housing of the blower in company with a flow of the starch to be heated and dried.

The starch to be heated and dried may be supplied from a hopper or other source from which a feed tube 4 extends, said tube containing a spiral feeder or screw 5 by means of which the starch is continuously and uniformly fed into the housing of the blower. It is to be noted that the outlet 6 of the tube 4 is so positioned in the inlet of the housing 1 that the starch leaving said outlet 6 impinges directly against the blades of the blower, and the starch particles are not only separated, but piling up or accumulation of the starch within the entrance end of the blower is avoided.

The heated air and starch fed into the blower as above described, are whirled by the blower and then blow through a relatively lengthy, constantly-rotated tube 7 rotatively connected to and forming an extension of the outlet end 8 of the blower. Said tube 7 may be insulated to confine the heated air. The tube 7 may be suitably supported in any desired manner, and in the construction shown in the drawing, it is maintained between a plurality of idler rollers 9, which are rotatively operative against the peripheral surface of the tube 7. Each roller 9 is rotatively supported in a bearing bracket 10 secured to a frame element 11 or other fixed portion of the apparatus. The tube 7 may be rotated in any suitable manner at a relatively low speed, and in the arrangement shown, the tube is provided with a pulley 12 secured upon it and engaged by a belt 13 extending from an electric motor or other driving means. As an alternative for this driving arrangement, sprockets and chains or suitable gearing might be used. For example, in Fig. 4 the tube 7 is shown as being provided with a gear 19 secured upon it, which gear meshes with a smaller gear or pinion 20 carried by the shaft 21. Shaft 21 is rotative in a bearing bracket 22, and said shaft carries sprocket 23 driven by a chain 24 extending from the motor or other power source. Also, while the tube 7 is shown as being directly driven by positive drive means, the rollers 9 instead of being idlers, might be driven by positive drive means and caused, by their frictional contact with the surface of the tube, to rotate the tube.

Located within the tube 7 and secured to, or integrally formed on the inside wall surface of the tube, is a plurality of longitudinally-extending vanes or lengthy fins arranged radially or tangentially, and in staggered relation. These vanes extending inwardly from the wall of the tube and providing an interrupted interior surface within the tube 7 in a manner to prevent the collection or heaping of starch within the tube, impart a tumbling action to the starch as the starch is moved through the tube 7 by the air flow from the blower.

The outer end of the rotated and interiorly-vaned tube 7 is rotative within the end of an inlet tube 15, forming part of a separator 16 of known construction, such as that type known as a "cyclone" and by which the heated air is separated from the starch by the action of centrifugal force produced by the whirling or rotative movement of the air within a cylindrical or volute casing. In this device, the starch is thrown against the wall of the separator casing and allowed to gravitate toward the outlet opening at the bottom of the cyclone housing. The starch thus emanating from the cyclone outlet is collected into a suitable receptacle, or it may be directed into a hopper and be carried therefrom to its point of usage, by a suitable screw conveyor or other conveying means. The heated air, rendered substantially free of all starch, passes upwardly through the air outlet 17, which can contain a filter to reclaim any starch that might be carried upward and into the air outlet 17.

Through the arrangement described, heated air is drawn into the blower together with the starch that is impinged directly against the blades of the blower rotor, and the air and starch are forced into the rotating, vaned or finned tube 7. The driest starch blows directly through the rotating tube 7 into the cyclone 16. The heavier starch, or that possessing the greater amount of moisture, drops to the bottom of the tube and is carried upwardly by the vanes or fins 17 to reach the top of the tube when it will drop down by gravity. In falling from top to bottom in the tube, such tumbling action of the starch will cause it to pass through the current of heated air passing through the tube 7, and the starch will be dried and blown axially through the tube 7 into the entrance tube 15 of the cyclone 16 and then into the cyclone. The continuous rotative movement of the internally-vaned or finned tube 7 prevents the building up or heaping of the starch within the tube and the tumbling movement of the starch while it is passing through the tube, caused by the continual dropping of the starch from top to bottom of the tube, results in most complete drying of the starch in the shortest possible time. Also, when the rotation of the tube 7 is ceased it is found that the interior of the tube will be practically free of starch.

It will be, of course, understood that the apparatus herein disclosed is shown in its simplest form and may be varied in numerous ways. It will be further understood that various controls may be applied to the apparatus by means of which controllability of the temperature of the air; its flow into the blower; the amount of starch fed into the blower housing and other features may be varied and regulated, to not only secure the extent of humidity required in the product, but to secure the desired output.

In herein referring to the product treated as "starch" I have done so because of the success had in treating this specific material in the manner described, but it will be apparent that similar treatment might be applied to flour and possibly other products. The starch or other material fed into the blower might be fresh or unused material, or the blower might be in communication with a filtering and feeding means by which previously-used and reclaimed starch can be fed into it for drying.

While I have herein described one embodiment of the invention, it is obvious that the same is not to be restricted thereto, but is broad enough to cover all structures coming within the scope of the annexed claim.

What I claim is:

An apparatus for drying starch and similar products comprising, a compression blower, a duct connected to the same to supply heated air into the blower, the blower including a housing within which a bladed rotor is operative, a conduit extending at an angle through a side of the heated air duct to a lower edge of an entrance opening in the housing of the blower and through which starch is fed directly into said housing and against the blades of the rotor thereof immediately upon its flow from the conduit, an internally-finned rotatable outlet tube leading from the blower housing and through which heated air and starch are forced by the blower, spaced rollers arranged above and below the tube for supporting the same, drive means located centrally of the tube and between the rollers for continuously rotating said tube while the heated air is forced through it, and a separator connected to said tube for separating the dried starch from the heated air.

References Cited in the file of this patent
UNITED STATES PATENTS

| Re. 12,655 | Power | May 21, 1907 |
| 486,806 | Batcheller | Nov. 22, 1892 |
| 1,477,469 | Wallace | Dec. 11, 1923 |
| 1,717,661 | Calvert | June 18, 1929 |
| 2,117,822 | Pehrson et al. | May 17, 1938 |
| 2,266,292 | Arnold | Dec. 16, 1941 |
| 2,316,207 | Winter | Apr. 13, 1943 |
| 2,535,570 | Gordon | Dec. 26, 1950 |